United States Patent
Unruh et al.

[11] Patent Number: 5,904,338
[45] Date of Patent: May 18, 1999

[54] VALVE

[75] Inventors: Roland Unruh, Hameln; Rainer Kesselhut, Herbram; Heinrich Kramig, Delbrück, all of Germany

[73] Assignee: ARI Armaturen Albert Richter GmbH & Co. KG, Schloss Holte-Stukenbrock, Germany

[21] Appl. No.: 09/040,924

[22] Filed: Mar. 18, 1998

[30] Foreign Application Priority Data

Mar. 21, 1997 [DE] Germany .......................... 197 11 839

[51] Int. Cl.⁶ ...................................................... F16K 1/22
[52] U.S. Cl. ...................... 251/359; 137/527.4; 137/527; 251/84; 251/333
[58] Field of Search ................. 137/527, 527.6, 137/527.8; 251/333, 359

[56] References Cited

U.S. PATENT DOCUMENTS

| 474,843 | 5/1892 | Mahan | 137/527.8 |
| 4,792,119 | 12/1988 | Illy | 251/333 |
| 5,682,921 | 11/1997 | Rawson | 137/527.6 |

*Primary Examiner*—John Rivell
*Assistant Examiner*—Ramyar Farid
*Attorney, Agent, or Firm*—Henry M. Feiereisen

[57] ABSTRACT

A valve, includes a housing formed with a valve seat and having an inlet port and an outlet port; and a shut-off member positioned in a passageway between the inlet port and outlet port and so adjustable as to enable a separation of the inlet port and the outlet port from one another when seated on the valve seat, wherein the valve seat exhibits a seat surface which is so inclined in circumferential direction that intersections of diametrically opposed tangents constructed on the seat surface of the valve seat define an area.

4 Claims, 3 Drawing Sheets

VALVE

BACKGROUND OF THE INVENTION

The present invention generally relates to a valve, and in particular to a valve of a type having a housing formed with a valve seat and having an inlet port and an outlet port, and a shut-off member positioned in a passageway between the inlet port and outlet port and so adjustable as to enable a separation of the inlet port and the outlet port from one another when resting on the valve seat.

A valve of this type is known e.g. from German Pat. No. 36 09 772 and in particular describes a valve seat which exhibits a seat surface which is so configured that the intersection of all tangents drawn on the seat surface form an imaginary cone, with the valve seat forming a slanted cut through this cone. Basically, the flow efficiency of such valves depends on the opening angle which influences the surface lines and thus the flow cross section which should be selected as large as possible in order to enable a substantially unhindered fluid passage. On the other hand, the dimensions of such valves, especially with regard to their structural length are standardized so that conventional seat surfaces cannot be configured for an optimum flow throughput. For example, a large opening cross section shaped to enhance flow dynamics cannot be realized because the standardized outer structural dimensions limit the opening angle of the cone.

Determination of the flow efficiency is dependent besides on the flow velocity and rate of flow for pure liquids also on the same parameters for solids-laden liquids. Practice has shown that in this case the application of conventional valves is problematic heretofore.

SUMMARY OF THE INVENTION

It is thus an object of the present invention to provide an improved valve, obviating the afore-stated drawbacks.

In particular, it is an object of the present invention to provide an improved valve which enables optimum flow efficiency conditions.

These objects, and others which will become apparent hereinafter, are attained in accordance with the present invention, by providing a valve seat which exhibits a seat surface so inclined in circumferential direction that intersections of tangents, which are drawn on the seat surface of the valve seat and positioned in diametric opposite disposition, define an area.

By so configuring the seat surface of the valve seat, the space dictated by the standard with respect to structural length can now be utilized for greatest possible opening cross section in the area of the valve seat. The angle of inclination of the seat surface of the valve seat with respect to the flow direction is dependent from the positional stability and the self-centering action of the shut-off member which is so configured as to match in the contact area the configuration of the seat surface, whereby it is immaterial whether the angle of inclination of the seat surface of the valve seat is the same or varies about the entire circumference with respect the vertical relative to the flow direction of the fluid. It is only relevant that the intersections of diametrically opposed tangents drawn on the seat surface, define an area, i.e. no common axis of rotation as conventionally taught heretofore.

According to another embodiment of the present invention, the valve seat has a circumferential seat surface which extends at a right angle to the vertical with respect to the flow direction of the fluid. This has the particular advantage to keep the flow resistance very low.

Apart of an improved operational capability especially in conjunction with a reduced flow resistance, a valve according to the present invention covers also a much wider range for application compared to conventional such valves.

By matching the shut-off member in the contact area with the valve seat to the seat surface, a self-centering capability is attained by the shut-off member at the same time. Moreover, the closing force which is to be applied by a spindle upon the shut-off member in order to effect a fluid tightness can be low, resulting in an improved handling of the armature.

A valve according to the present invention can be manufactured in a simple manner, as the seat surface can be made through a material removal process.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
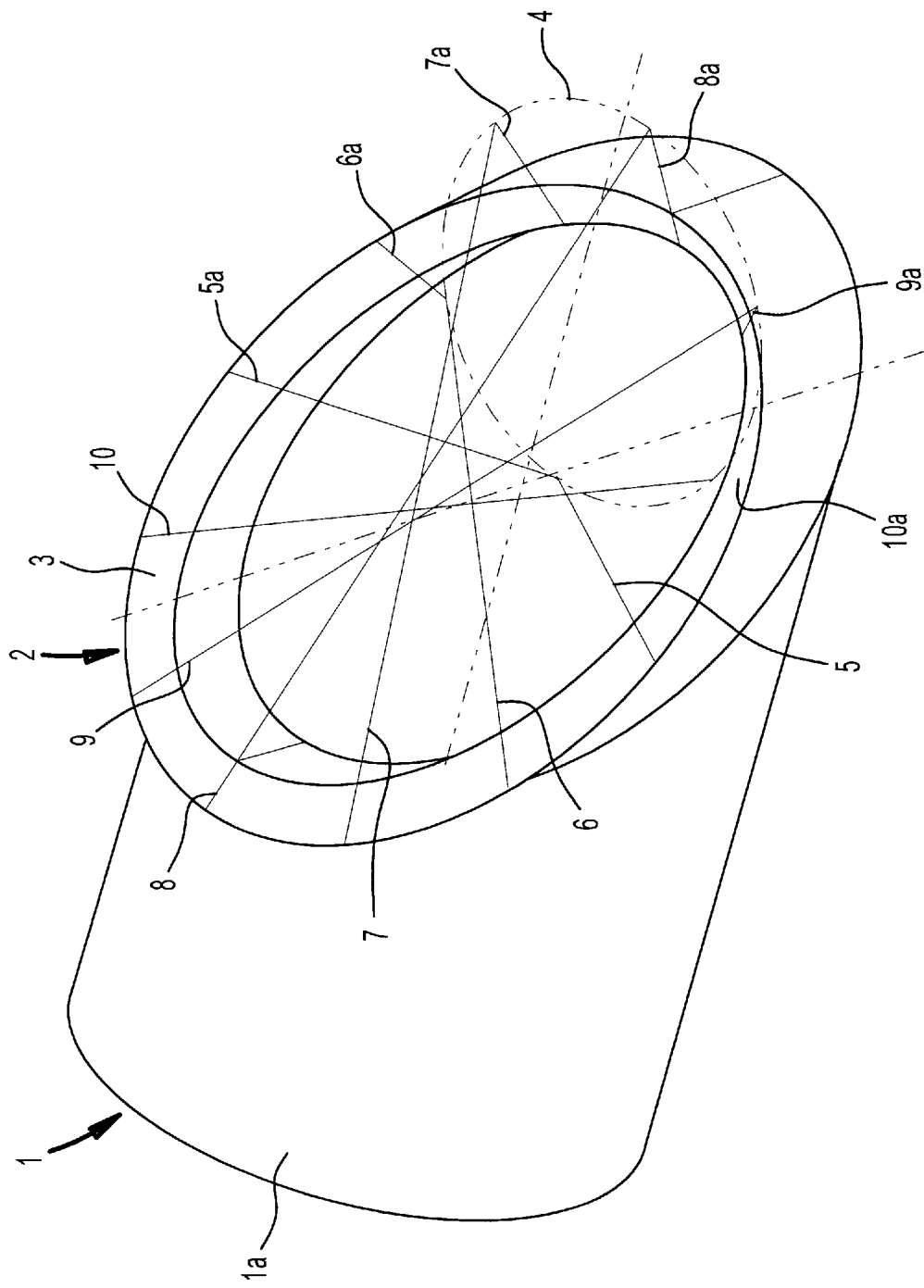
FIG. 1 shows a fragmentary, schematic, perspective illustration of a valve according to the present invention, showing in detail the area of a valve seat and illustrating the principle upon which the present invention is based.

Throughout all the Figures, same or corresponding elements are generally indicated by same reference numerals.

Figure 4:
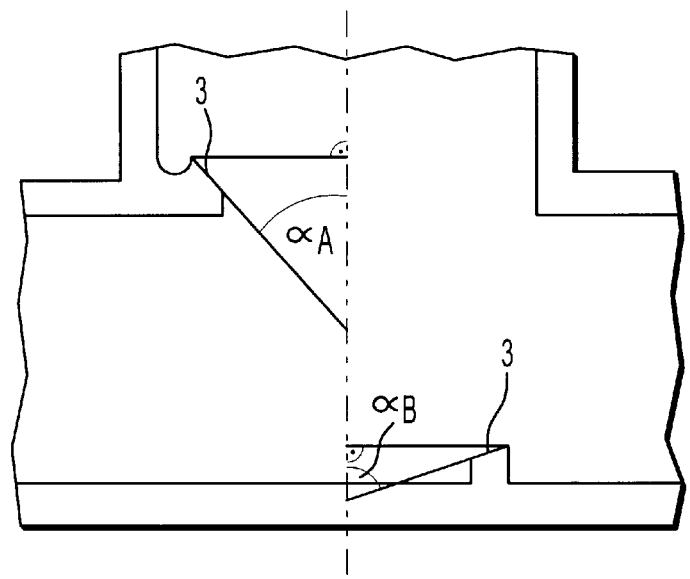
Figure 5:
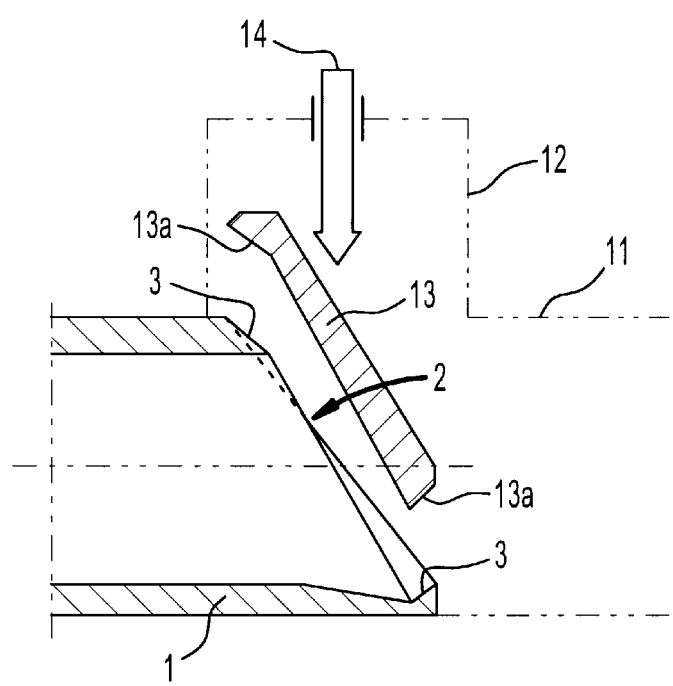
FIG. 5 is a schematic longitudinal section of still another embodiment of a valve according to the present invention.

Turning now to the drawing, and in particular to FIG. 1, there is shown a fragmentary, schematic, perspective illustration of a valve according to the present invention, including a housing, generally designated by reference numeral 1 and formed with an inlet port 1a and an outlet port 11 (FIG. 5). The inlet port 1a is formed with a valve seat, generally designated by reference numeral 2 which is slanted at an angle of e.g. 45°, or in case of flap valves at an angle of 90°. The valve seat 2 has a seat surface 3 which as depicted in FIGS. 3 and 4, extends at an angle α with respect to a vertical relative to the flow direction of fluid between the inlet port 1a and outlet port 11.

As shown in FIG. 1, the seat surface 3 is so configured that all intersections of diametrically opposed tangents 5, 5a; 6, 6a; 7, 7a; 8, 8a; 9, 9a; 10, 10a, drawn on the seat surface 3 circumscribe an area which is depicted in dashdot line 4.

Figure 2:
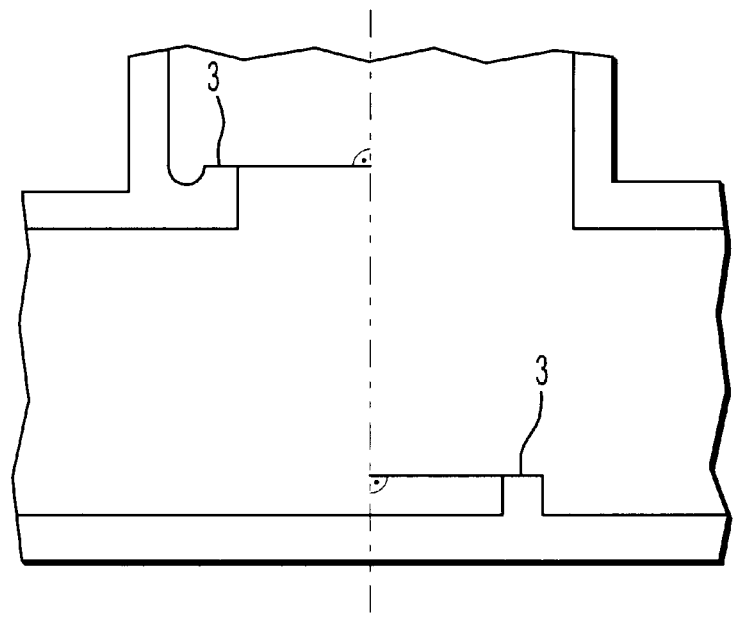
FIGS. 2 to 4 show schematic longitudinal sections of various embodiments of a valve seat of a valve according to the present invention.

FIG. 2 shows an embodiment of a valve according to the present invention, in which the circumferential seat surface 3 extends at 90° to a vertical with respect to the fluid flow direction so that cross sections of the seat surfaces 3 extend parallel to one another.

Figure 3:
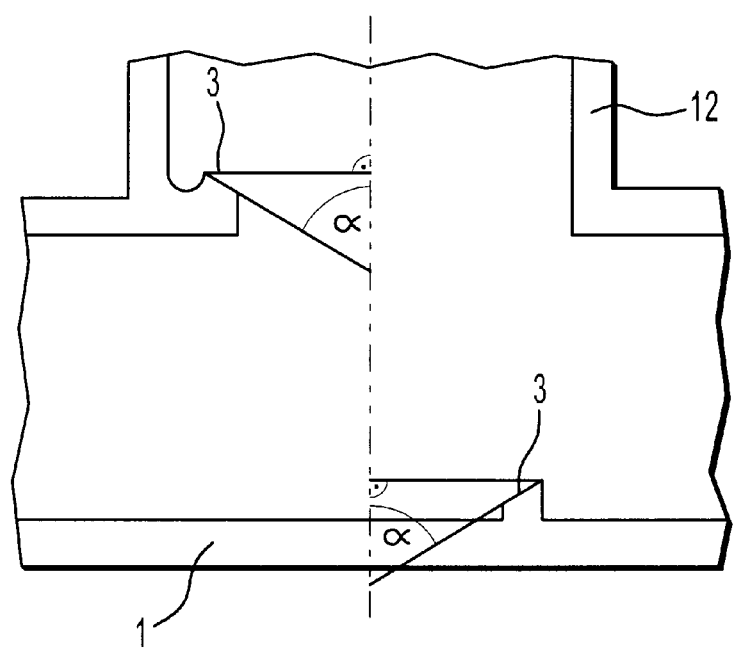

FIG. 3 shows another embodiment of a valve according to the present invention in which the seat surface 3 of the valve seat 2 exhibits a same angle α about the entire circumference with respect to the vertical relative to the flow direction. The vertical may form at the same time the direction of action of a spindle 14 (FIG. 5) by which a shut-off member 13 (FIG. 5) is forced against the seat surface 3.

FIG. 4 shows still another embodiment of a valve according to the present invention, in which the angle α varies over the circumference of the seat surface 3. For ease of understanding, the angle of inclination in the region of the upper cross section of the seat surface 3 is denoted by reference character $\alpha_A$ while the angle of inclination in the region of the lower cross section of the seat surface 3 is denoted by reference character $\alpha_B$. The magnitude of the respective angle is determined by operational conditions that depend i.a. from the type of fluid.

As also indicated shown in FIGS. 2 to 4, the valve further includes a sleeve 12 positioned perpendicular to the inlet port 1a and outlet port 11 for accommodating the shut-off member 13 and the spindle 14.

FIG. 5 shows an embodiment of a valve in which the seat surface 3 of the valve seat 2 is so slanted as to form a different angle $\alpha_A$ and $\alpha_B$ in the upper and opposite lower regions with respect to the vertical. FIG. 5 also shows that the shut-off member 13 is suited to the valve seat 2 such that its side 13a that comes into contact with the seat surface 3 is so configured as to match the angles $\alpha_A$ and $\alpha_B$ of the seat surface 3 to thereby effect a self-centering action of the shut-off member 13 during closing operation.

While the invention has been illustrated and described as embodied in a valve, it is not intended to be limited to the details shown since various modifications and structural changes may be made without departing in any way from the spirit of the present invention.

What is claimed as new and desired to be protected by Letters Patent is set forth in the appended claims:

1. A valve, comprising:
   a housing formed with a valve seat and having an inlet port and an outlet port; and
   a shut-off member positioned in a passageway between the inlet port and the outlet port and so adjustable as to enable a separation of the inlet port and the outlet port from one another when resting on the valve seat;
   wherein said valve seat exhibits a flat annular seat surface, said seat surface defining an infinite number of radially spaced coplanar line segments, wherein intersections of diametrically opposed line segments constructed on the seat surface of the valve seat form a closed curve to bound an area.

2. The valve of claim 1 wherein the seat surface defines an angle of inclination which is the same about the entire circumference.

3. The valve of claim 1 wherein the seat surface defines an angle of inclination which varies at least over part of its circumference with respect to a vertical upon a fluid flow direction.

4. The valve of claim 1, and further comprising a spindle articulated off-center on the shut-off member in dependence on the inclination of the valve seat.

* * * * *